United States Patent [19]

Staar

[11] 4,017,901
[45] Apr. 12, 1977

[54] DEVICE FOR LOADING AND UNLOADING CARTRIDGES INTO AND FROM A RECORDING AND/OR PLAYBACK APPARATUS

[75] Inventor: Theophiel Clement Jozef Lodewijk Staar, Kraainem, Belgium

[73] Assignee: Staar, S.A., Brussels, Belgium

[22] Filed: July 29, 1975

[21] Appl. No.: 600,090

[30] Foreign Application Priority Data

July 30, 1974 France .............................. 74.26452

[52] U.S. Cl. ................................ 360/137; 360/132
[51] Int. Cl.² ......................................... G11B 23/08
[58] Field of Search ............... 360/137, 132, 93–96, 360/85; 179/100.11; 292/336, 197, 198; 220/244, 335

[56] References Cited

UNITED STATES PATENTS

| 3,665,114 | 5/1972 | Hathaway | 360/132 |
|---|---|---|---|
| 3,764,757 | 10/1973 | Inaga | 360/85 |
| 3,893,186 | 7/1975 | Yoshii | 360/96 |
| 3,900,170 | 8/1975 | Serizawa | 360/96 |
| 3,950,787 | 4/1976 | Hosaka | 360/137 |

Primary Examiner—Jay P. Lucas
Attorney, Agent, or Firm—Leydig, Voit, Osann, Mayer & Holt, Ltd.

[57] ABSTRACT

A device for loading and unloading cartridges into and from a recording and/or playback apparatus for magnetic tapes stored in cartridges of the type provided on their front face with a door for the withdrawal of the magnetic tape, the device including a housing member into which the cartridge is slidably inserted, the housing having a cam to open the door of the cartridge automatically as the cartridge is inserted; rollers carried by a shaft biasing the cartridge against the lower wall of the housing; resilient spring blades biasing said roller means downwardly in a way which permits the insertion of a cartridge with its door open; and a pair of support slits provided in the side walls of the housing and into which the ends of the shaft can slide to allow vertical movement of the rollers under the effect of the spring blades, the vertical movement of the shaft causing the door of the cartridge to close automatically when the latter is disengaged from the housing.

4 Claims, 12 Drawing Figures

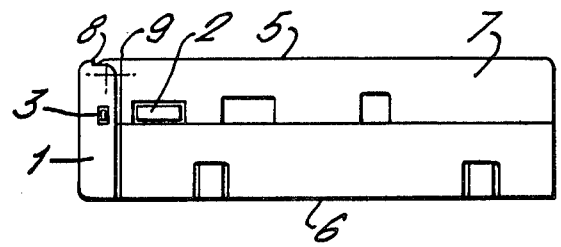
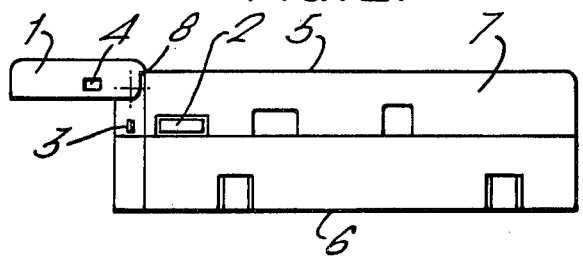
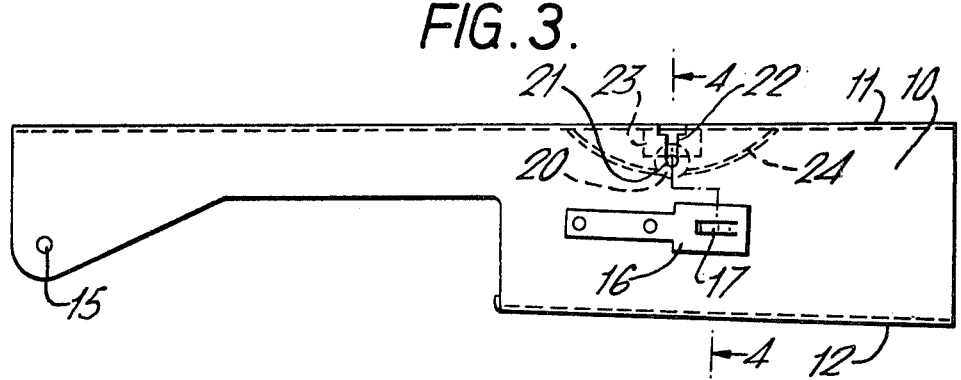
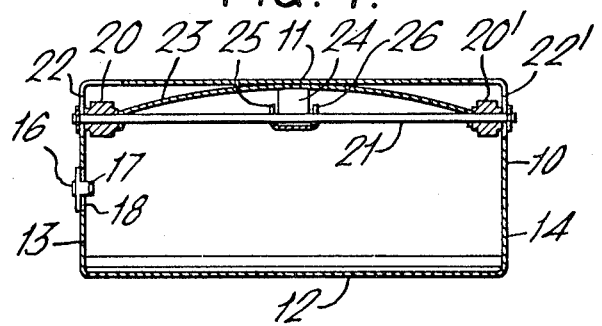

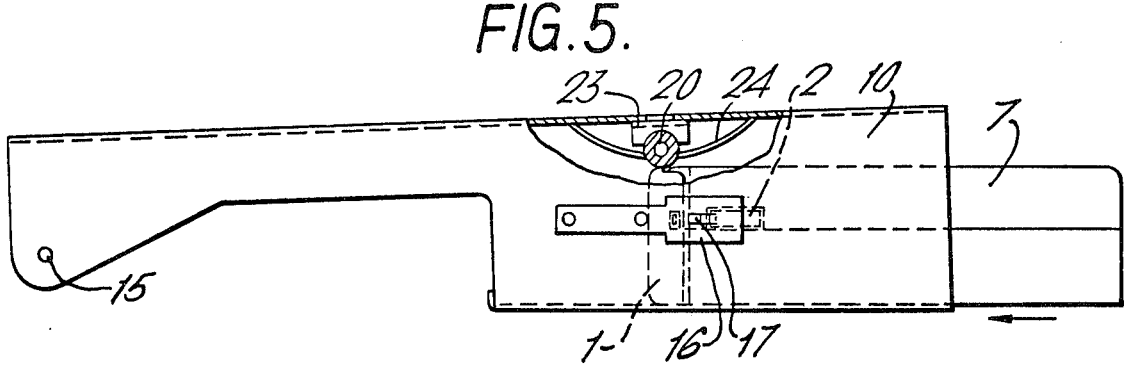
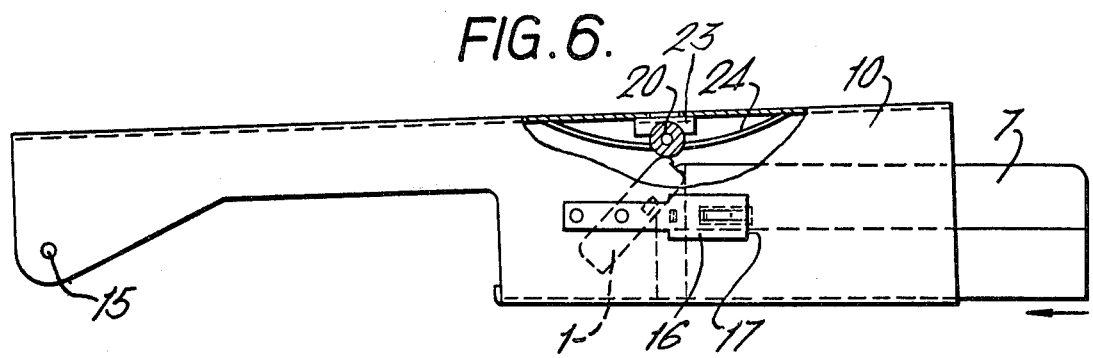
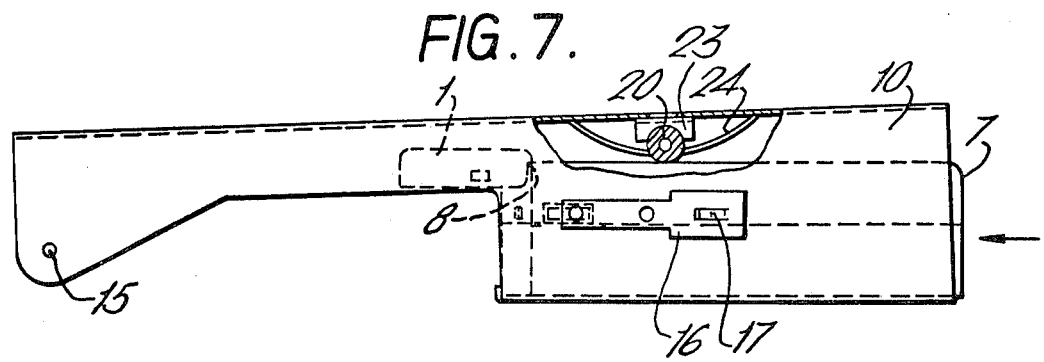

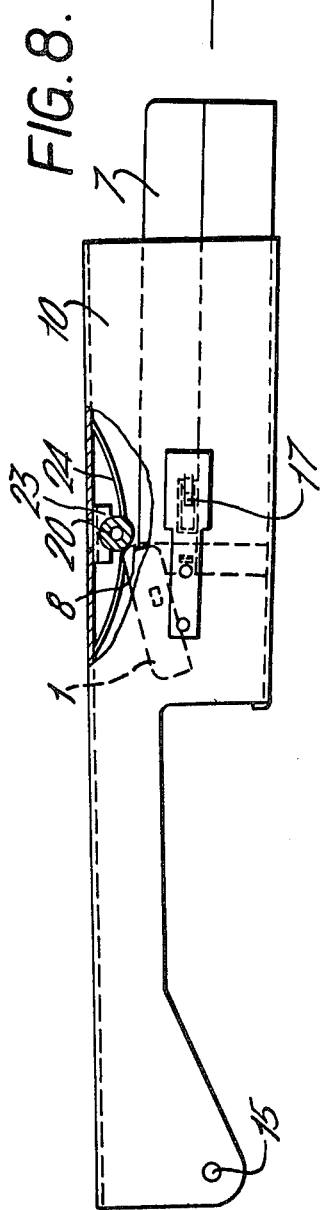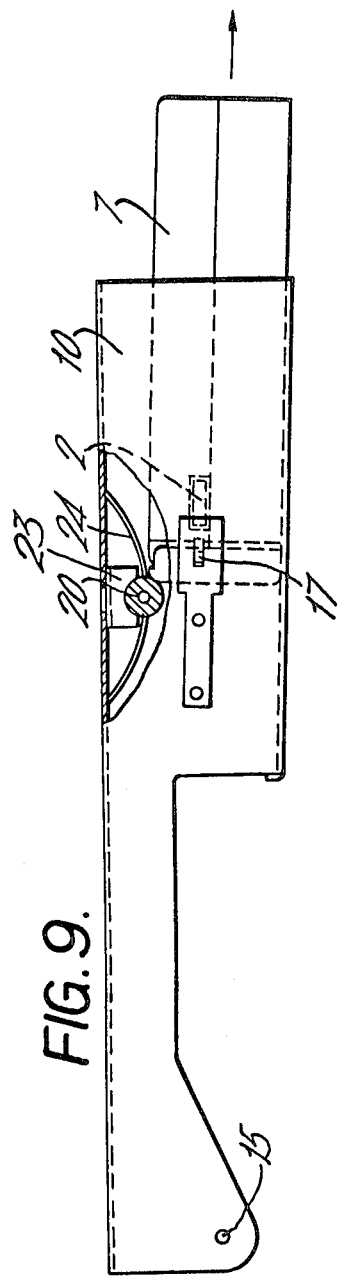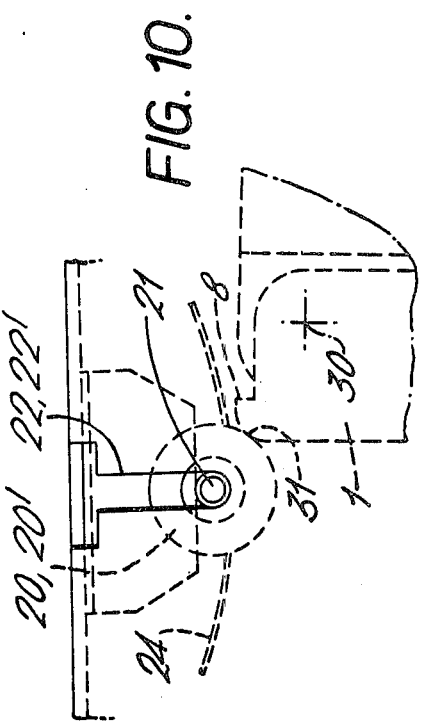

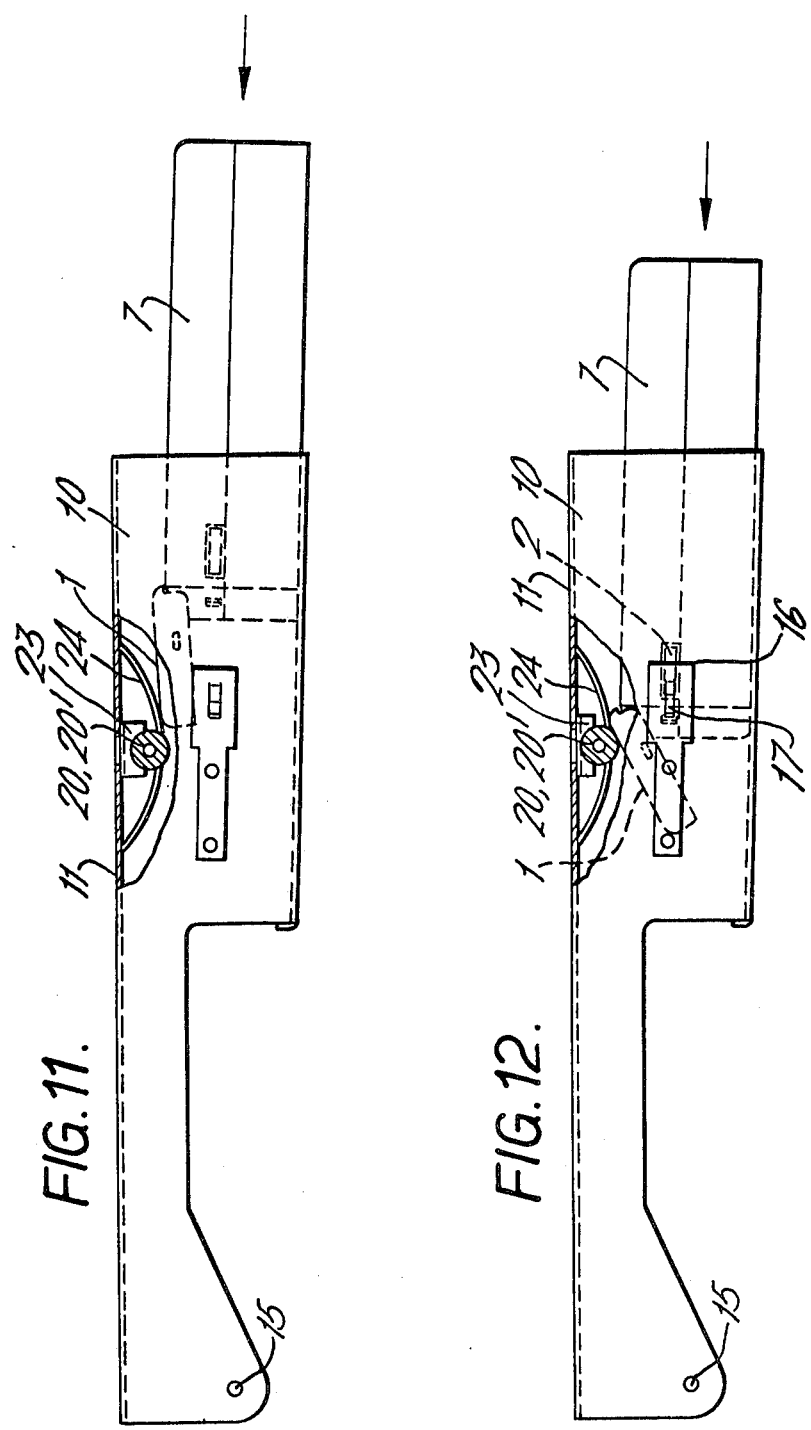

DEVICE FOR LOADING AND UNLOADING CARTRIDGES INTO AND FROM A RECORDING AND/OR PLAYBACK APPARATUS

The present invention relates generally to apparatus for recording and/or playback of information from magnetic tapes stored in cartridges in which the tape is unwound from a reel and wound onto another, after having passed in front of the recording or pick-up devices. It relates more particularly to apparatus which record and/or reproduce video and audio information and which comprise a rotary magnetic transducer head with one or more pick-up elements.

To be placed in the operative position a cartridge of this kind is lowered onto the elements which have to penetrate it perpendicularly to its main surface, such as the shafts of the take-up and feed reels, the rods for guiding the tape around the drum of the magnetic head, and other elements.

In order to facilitate and simplify the positioning and removing operation of a cartridge and to ensure that it will be correctly positioned with respect to the drive and guide elements which have to penetrate it and to cooperate therewith, the known types of apparatus have been designed with a housing into which the cartridge is inserted by sliding it in along a plane parallel to its main surface, the housing being then pivoted together with the cartridge about an axis of the said plane in order to cause the cartridge to engage the aforementioned elements of the apparatus which are required to penetrate the said surface.

Many of the presently commercially available magnetic tape cartridges comprise a flat-shaped housing of rectangular parallelopipedal shape, containing two superposed reels. One of the main surfaces of the cartridge is provided with apertures to accommodate the drive and guide elements of the apparatus. As the magnetic tape has to be withdrawn from the cartridge in order to be wound around the drum of the magnetic transducer head, the cartridge is provided, on its front face, with a door articulated to the intersection of this face and the top main surface opposite to that, the bottom surface, having the apertures.

In order to close the door of the cartridge, it is sufficient to turn it against the action of a spring, until the moment when a latch, provided on one of the side walls of the cartridge, has just been caused by the action of a spring blade to engage an aperture provided for this purpose in the door. The door of the cartridge thus remains locked.

The cartridge and the housing also include means which coact to cause the door to open automatically during the insertion of the cartridge into the housing. For this purpose, a release knob to unlock the door retaining latch is provided next to this latter in the side wall of the cartridge. When the cartridge is slid into the housing, this release knob is actuated by a cam provided on a spring blade, which latter is affixed to a side wall of the housing. The operation of this knob causes the latch to move back, thus unlocking the door, which can then open freely under the action of its spring.

In order to enable the cartridge to be accurately positioned without impeding the insertion and withdrawal of the cartridge into and from its housing, the type of housing used heretofore, is provided underneath its top or upper surface, with a pair of rollers spaced above the bottom surface to roll over the upper surface of the cartridge when the latter is inserted into the housing.

These types of apparatus, however, do not make it possible to insert a cartridge of which the door is already open, which may occur, for example, when the door release knob is inadvertently actuated during the handling of a cartridge. If this door is not closed again before the cartridge is inserted in the housing, it may be engaged between the rollers and the top or upper surface of the housing, thus preventing the cartridge from being completely inserted. In the known apparatus the risk of an oversight of this kind is even greater since the door is not automatically reclosed when the cartridge is removed from its housing.

The object of the present invention is to remedy these drawbacks and to provide a simply designed device which not only simplifies the insertion of the cartridge into its housing and its removal therefrom, regardless of whether the door is closed or open, but which also ensures that the door will close automatically when the cartridge is removed from its housing.

To achieve this object, the present invention provides a device for loading and unloading cartridges into and from a recording and/or playback apparatus for magnetic tapes stored in cartridges of the type provided on their front face with a door for the withdrawal of the magnetic tape, the device including a housing member into which the cartridge is slidably inserted, said housing being provided with means to open the door of the cartridge automatically as the cartridge is inserted; resilient means for biasing the cartridge against the lower wall of the housing, comprising roller means carried by a shaft; resilient means biasing said roller means downwardly in a way which permits the insertion of a cartridge with its door open; and a pair of slits provided in the side walls of the housing and into which the ends of the said shaft can slide to allow vertical movement of said roller means under the effect of the said resilient means, said vertical movement of the shaft causing the door of the cartridge to close automatically when the latter is disengaged from the housing.

To enable the invention to be clearly understood, a detailed description will now be given of an example thereof, without any limitative effect and by reference to the drawings, in which:

FIGS. 1 and 2 are side views of a cartridge, open and closed respectively.

FIG. 3 is a side view of a cartridge housing according to the present invention.

FIG. 4 is a section along the line 4—4 of the housing shown in FIG. 3.

FIGS. 5, 6 and 7 show successive stages during the insertion of the cartridge into the housing.

FIGS. 8 and 9 show successive stages during the removal of the cartridge from the housing.

FIG. 10 shows the door closing operation in detail.

FIGS. 11 and 12 illustrate two stages during the insertion of the cartridge with its door open, into its housing.

FIGS. 1 and 2 show the main elements of a self-contained video cartridge 7 at present on the market. This cartridge 7 comprises a door 1, shown in FIG. 1 in the closed position and in FIG. 2 in the open position. One side wall of the cartridge 7 is provided with two apertures accommodating an unlocking knob 2 for the door 1 and a latch 3 for locking the door 1, respectively. The knob 2 and the latch 3 are integral with a spring blade, not shown in the drawing, affixed to the interior of the aforementioned side wall of the cartridge. The latch 3, under the effect of the spring blade, engages an aperture 4 provided for this purpose in a side wall of the door 1 and keeps the said door 1 in the closed position. A slight pressure on the knob 2 causes the latch 3 to move out of the aperture 4 of the door 1, which can then open freely under the action of the spring, not shown in the drawing. The knob 2 serves first and foremost to ensure the automatic opening of the door during the introduction of the cartridge 7 into a housing 10 (see FIG. 3). In order to prevent the door from opening beyond the plane of the top surface 5 of the cartridge 7, the door 1 is provided, close to its hinge, with a projection 8 which, during the opening of the door, comes to rest against the edge 9 of the top of surface 5 of the cartridge, thus keeping the door 1, under the effect of its spring, in a position in which it forms a prolongation to the top surface 5 of the cartridge.

The cartridge 7 is provided, in its bottom surface 6, with apertures not shown in the drawing, designed to accommodate elements of the recording and playback apparatus which must penetrate the cartridge to permit the recording and/or playback operations.

FIGS. 3 and 4 are schematic diagrams of the details of the cartridge housing to which the present invention relates. This housing, which is marked 10 as a whole and into which the cartridge 7 is required to penetrate, comprises an upper wall 11, a lower wall 12 and two side walls 13 and 14. The housing 10 can pivot about the shaft 15, which is mounted in the frame of the apparatus.

To the outside of the wall 13 is affixed a spring blade containing a cut-out part in the shape of a U. The central portion of this cut-out part is bent in the form of a circumflex accent, to form a cam 17 which passes through and projects from an aperture 18 in the wall 13. The cam 17, on the passage of the cartridge 7, actuates the unlocking knob 2, thus causing the door 1 of the cartridge to open.

Two rollers 20 and 20' are mounted on a common shaft 21 and are able to turn freely with this shaft, in such a way as to roll over the top surface 5 of the cartridge. The shaft 21 of these rollers 20 and 20' is supported by two vertical slits 22 and 22' provided in the opposite side walls 13 and 14 respectively of the housing 10. These two supporting slits 22 and 22' enable the shaft 21 of the rollers 20 and 20' to move vertically. This vertical movement of the rollers 20 and 20', one of the essential characteristics of the invention, ensures that the door 1 of the cartridge will close automatically when the cartridge is withdrawn, as will be explained in detail hereinafter. Underneath the upper wall 11 of the housing 10 there are resilient means biasing the roller and shaft assembly downward. Two spring blades 23 and 24, crossing over each other at right angles. The blade 23 is parallel to the shaft 21 of the rollers 20 and 20' and is positioned between this shaft 21 and the upper wall 11 of the housing 10. The central part of this blade 23 rests against the upper wall 11, while the two ends of the blade 23 straddle the shaft 21 of the rollers 20 and 20' and resiliently bias this shaft away from the upper wall 11 of the housing 10. The other blade 24 is situated perpendicularly to the shaft 21 of the rollers 20 and 20', i.e., extending longitudinally of the path of cartridge 7, and rests by its two ends against the upper wall 11 of the housing 10. The central part of this blade 24 passes under the shaft 21 and is provided with two tabs 25 and 26 having slots to give passage to the said shaft 21. This blade 24 assists the action of moving the shaft 21 and the rollers 20 and 20' away from the upper wall 11 and also, as discussed below, is an essential element facilitating insertion of the cartridge 7, with its door open, into the housing 10.

FIGS. 5, 6 and 7 show successive stages during the insertion of cartridge 7 into the housing, with the door 1 of the cartridge closed. At the first stage (FIG. 5) the rollers 20 and 20' are moved toward the upper wall 11 of the housing 10 by the cartridge 7, in opposition to the action of the spring blades 23 and 24. Then the rollers 20 and 20' roll over the top surface 5 of the cartridge as the cartridge 7 is inserted into housing 10.

The pressure exerted by the cam 17 on the knob 2, during the passage of the cartridge 7, causes the door 1 to be unlocked, after which it can open freely (FIG. 6). In FIG. 7 the cartridge 7 has been completely inserted into housing 10. The relationship between cartridge 7 and housing 10 as shown in FIG. 7 remains the same as housing 10 is pivoted into the position required for the record and/or playback operations.

FIGS. 8, 9 and 10 show stages during the removal of the cartridge 7 from its housing 10 and, more particularly, illustrate the operation of the automatic closure of the door 1 of the cartridge 7. When the cartridge 7 has been removed from its housing 10 in the direction shown by the arrow in FIG. 8, the projection 8 of the door 1 encounters the rollers 20 and 20', which, under the action of the spring blades 23 and 24, tilt said projection 8 and the door 1 about the hinge 30 (FIG. 10). The door 1, as a result of the interaction of the rollers 20 and 20', pivots about the hinge 30 and tends to reclose (FIG. 8).

The cartridge housings known heretofore do not enable the door of the cartridge to close completely and automatically when the cassette is removed from the housing. Instead, the door is only partly closed in the known devices, being allowed to reopen under the effect of its own spring as soon as the door is no longer subject to the influence of the rollers.

In contrast, the cartridge housing according to the present invention enables the door of the cartridge to be closed automatically and locked, so that the door remains closed after it is no longer under the influence of the spring blades of the rollers.

The automatic closure of the door of the cartridge is shown in detail in FIGS. 9 and 10. As and when the cartridge 7 is removed from its housing 10 the rollers 20 and 20' roll over the top of the door 1 and, through the action of the spring blades 23 and 24, exert pressure successively on the projection 8 and the edge 31 of the door 1. In view of the fact that the shaft 21 can move vertically in the support slits 22 and 22' of the side walls 13 and 14 of the housing 10, the rollers 20 and 20' roll in continuous contact with the upper edge 31 of the door 1.

The length of the support slits 22 and 22' and the force of the springs 23 and 24 are designed to ensure that, as the door is about to pass beyond the influence of the rollers 20 and 20' (FIG. 9), the rollers 20 and 20' move suddenly to the base of the slits 22 and 22' to provide the door 1 with the necessary momentum to enable it to overcome the influence of its spring and to close completely. The door 1 remains locked, only able to be opened by the knob 2. But since the latter has already passed the cam 17 at the moment when the door is closed, the door 1 of cartridge 7 is closed as the cartridge is removed from the housing.

FIGS. 11 and 12 show a further essential characteristic of the cartridge housing according to the present invention. The cartridge housing according to the present invention facilitates the introduction of a cartridge with its door open without risk of jamming.

As explained above, the known cartridge housings require the door of the cartridge to be closed at the moment when the latter is introduced into its housing. If the door is open it jams between the shaft of the rollers and the upper wall of the housing, with the result that the cartridge and the housing might suffer damage.

According to the present invention, and as shown in FIG. 11, when the cartridge 7 is introduced, with its door 1 open, into the housing 10, the said door 1 is guided below the rollers 20 and 20' by the spring blade 24. As and when the cartridge 7 is slid toward its operative position, the door 1 tends to reclose under the action of the spring blades 23 and 24 of the rollers 20 and 20'. As soon as the said rollers 20 and 20' have passed the edge 31 of the door 1 this latter returns to the open position under the force of its own spring.

The spring blade 24 thus serves two essential functions in the cartridge housing according to the present invention. Firstly, it assists in exerting sufficient pressure on the rollers to slam the door of the cartridge when the latter is being extracted from the housing. Secondly, it enables the cartridge to be inserted in the housing with the door open.

I claim as my invention:

1. In a device for loading and unloading cartridges into and from a recording and/or playback apparatus for magnetic tapes stored in cartridges of the type provided with a pivotable door on their front face for the withdrawal of the magnetic tape, spring means acting to pivot the door to its open position, and latch means for holding the door in closed position against the action of the spring means, said device including a housing member into which a cartridge is slidably inserted having a lower wall and roller means spaced above the lower wall engaging the bottom and top surfaces of the cartridge respectively upon such insertion, and means coacting with means on the cartridge to release the latch means and enable the spring means to open the door of the cartridge automatically as the cartridge is inserted; the improvement in said housing member comprising:

means on said housing member for supporting said roller means for vertical movement; and resilient means a. biasing said roller means downwardly to a normal position below the plane on the top surface of the cartridge to engage the front of the door of the cartridge when the cartridge is inserted, front face forward, while allowing the roller means to raise and ride along the top surface of the cartridge, b. including an element connected to said roller means, located in the path of an inserted cartridge, and extending longitudinally of said path to be engaged by the opened door of a cartridge for cooperative raising of the roller means and lowering of the door to clear the door and cartridge and allow insertion of a cartridge with its door open, and c. acting to bias said roller means downwardly to engage and forcefully pivot the door of the cartridge to its closed position automatically as the latter is slidably removed from the housing member.

2. The improvement set forth in claim 1, wherein said roller means comprises rollers carried by a shaft, said means for supporting said roller means includes vertical slits in side walls of said housing member into which the ends of said shaft extend to support the same for vertical movement, and said resilient means comprises two spring blades crossing over each other and positioned between the shaft of the rollers and the upper wall of the housing, one comprising said element and the other extending transversely of said path.

3. The improvement set forth in claim 2, wherein said blades are curved in opposite directions and the two ends of the blade extending longitudinally of the path of movement of the cartridge rest against the upper wall of the housing member, while the ends of the blade positioned transversely to said path rest on the shaft of the rollers.

4. The improvement set forth in claim 1 wherein said housing member means coacting with means on the cartridge to open the door of the cartridge automatically as the cartridge is inserted includes a door unlocking knob and an elastic cam mounted respectively on adjacent side walls of the cartridge and of the housing member, the relative position of the knob and of the cam being such that the door can no longer be closed by the roller means after having been opened by the action of the cam on the knob during the insertion of the cartridge into the housing member and that it can no longer be opened by the action of the cam on the knob after having been closed by the action of the roller means during the removal of the cartridge from the housing member.

* * * * *